2,772,949

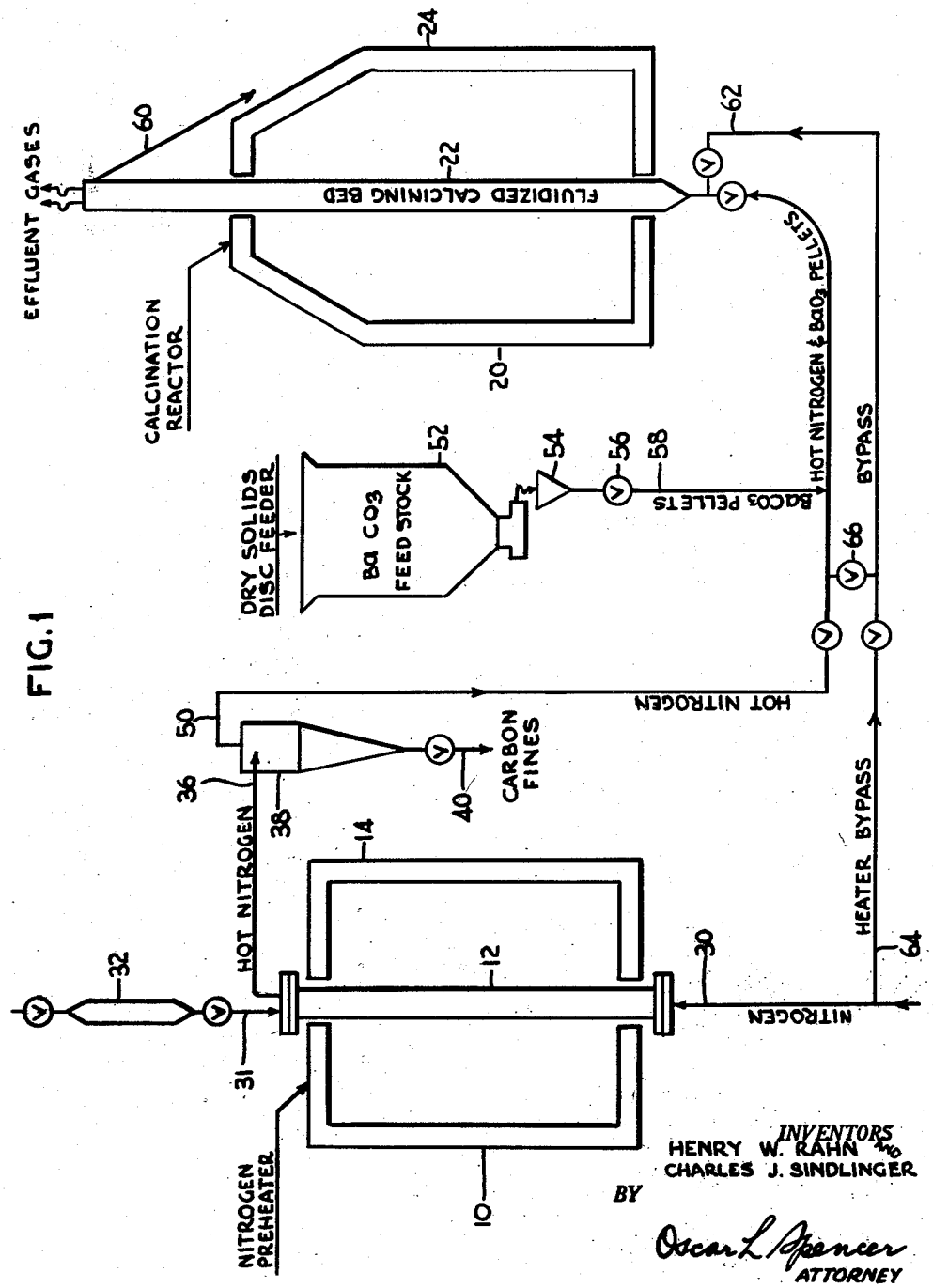

CALCINATION OF BARIUM CARBONATE

Henry W. Rahn and Charles J. Sindlinger, Corpus Christi, Tex., assignors to Columbia-Southern Chemical Corporation Application June 7, 1952, Serial No. 292,284

2 Claims. (Cl. 23—186)

This invention relates to the calcination of barium carbonate. According to a copending application for United States Letters Patent of Henry W. Rahn and Charles Sindlinger, Serial No. 279,786, filed April 1, 1952, methods of calcining barium carbonate are described. According to such methods, barium carbonate and a carbonaceous reducing agent are introduced into a reactor and heated to drive off carbon monoxide and to produce barium oxide. In general, the process is conducted by establishing a fluidized bed containing barium oxide, preferably in the form of granules, and adding barium carbonate granules thereto while heating the bed and maintaining the barium oxide content thereof sufficiently high to prevent fusion of the bed.

In the practice of such a process, it is necessary to supply substantial heat to the bed. This cannot be accomplished by burning fuel in the bed since carbon dioxide evolved during the burning reverses the calcination reaction. Accordingly, the required heat must be supplied through the walls of the furnace enclosing the bed.

The fact that heat must be so supplied makes it important that the furnace walls be constructed of metal since nonmetallic refractory materials do not readily conduct heat. However, metal tends to be scoured and corroded in use because of the corrosive character of the barium oxide. Moreover, carbon deposits on the metal walls forming carbides, thus causing embrittlement of the metal.

According to the present invention, it has been found that these difficulties may be appreciably minimized by calcining the barium carbonate in a metal reactor the exposed walls of which are coated with a thin film of fused barium oxide or a mixture of barium oxide and barium carbonate. This film must be quite thin since otherwise the conductivity of heat through the walls becomes inefficient. In general, the thickness of this coating should not exceed 1/8 inch, and preferably should be 0.001 to 0.01 inch in thickness.

The coating may be formed by various means. According to one method, it may be applied by coating the metal with a thin layer of barium oxide or barium oxide and barium carbonate, for example, by applying a liquid suspension of these materials in a volatile solvent, such as naphtha, to the metal walls. The metal may then be heated to 1000° C. to cause the coating to adhere.

The temperature of heating should be sufficiently high to burn the coating into the metal or to cause it to fuse or coalesce into an adherent film. Since barium oxide forms a eutectic with barium carbonate which melts at a temperature below that at which either barium oxide or barium carbonate melts, it is preferred to use a mixture in the proportion of about 0.5 to 4 moles, preferably in the range of 1.5 to 3 moles of barium carbonate per mole of barium oxide. In such a case, heating the coated metal to a temperature of 900 to 1100° C. for a few minutes will be sufficient to bond and fuse the coating. Higher temperatures may be required where the barium carbonate content of the coating is low.

One effective method of establishing the desired coating involves calcination of barium carbonate granules in a fluidized bed under scale or film-forming conditions. For example, the elemental oxygen or moisture content of nitrogen used as the fluidizing gas may be adjusted to a point where scale formation is promoted, for example, 1 or 2 percent by volume. Calcination of barium carbonate is conducted under these conditions for a suitable period of time, usually not more than 30 to 60 minutes. Since operation under these conditions for an extended period is objectionable since it causes excessive scale formation, the conditions of calcination are adjusted within a short time so that the moisture and/or oxygen content of the fluidizing gas is below 0.5 and preferably below about 0.1 to 0.2 percent by volume. Thereafter, calcination is continued under these conditions so that little or no further film-formation occurs. Best results are achieved when the oxygen content of the fluidizing gas is below 0.01 percent by volume. This may be accomplished by mixing hydrogen with nitrogen or other gas to be used in the fluidizing and passing the mixture over a catalyst to cause the hydrogen to react with oxygen, producing water which may be removed by drying if necessary.

Metals to be used in construction of the reactor must be capable of withstanding the temperatures of operation, i. e., 900 to 1200° C. or above. Typical metal alloys useful for this purpose are various resistant stainless steels, corrosion resistant nickel alloys, and the like. The metal alloy which is especially suitable is that known as "Inconel" manufactured by International Nickel Company. This alloy contains 7 percent iron and 14 percent chromium, the balance being largely nickel. Also present are small percentages of carbon, manganese, and silica.

The calcination of the barium carbonate normally is conducted in the presence of a carbonaceous reducing agent, such as carbon, which reacts with the carbonate to liberate carbon monoxide.

Where it is intended to produce barium peroxide from the resulting barium oxide, the amount of carbon which may be used should not be excessive. The theoretical amount of carbon required to react with the barium carbonate to produce barium oxide and carbon monoxide is about 6 percent by weight of the barium carbonate. Where the carbon concentration exceeds more than about 6 percent, there exists a tendency for the carbon to remain in the barium oxide product produced. When this product is heated in air or oxygen in order to produce barium peroxide, the residual carbon reacts to form carbon dioxide with consequent production of barium carbonate. Such reaction, of course, tends to defeat the purpose of the process. On the other hand, it is usually impossible to operate with exactly the stoichiometric amount of carbon. Consequently, an amount of carbon of about 6 to 8 percent, based upon the barium carbonate in the composition, normally is used.

It should be understood that higher concentrations of carbon may be used where the barium oxide is to be used for purposes other than the production of barium peroxide. Moreover, even where the barium oxide is to be used for barium peroxide, such higher carbon concentrations may be used, provided a suitable method is resorted to in order to remove some or all of the carbon. For example, a mixture of barium oxide and carbon may be heated at an elevated temperature, for example, from 800 to 1100° C. while passing a mixture of nitrogen or like inert gas and oxygen, which mixture contains less than 20 percent by volume of oxygen. Such a process may be used to materially reduce the carbon concentration of the barium carbonate without excessive formation of barium carbonate. The barium oxide thus treated may be subjected to peroxidation without difficulty. Furthermore, barium oxide may be produced for other purposes using higher concentrations of carbon, for example, up to 20 percent or more of the weight of the barium carbonate. Such larger concentrations tend to reduce or minimize fusion problems.

In the calcination of barium carbonate, serious fusion problems arise, probably due to the tendency to form a barium oxide-barium carbonate eutectic. Whatever the cause, the tendency toward fusion may be minimized by maintaining the barium oxide content of the bed undergoing calcination above that of the low melting point eutectic which has the approximate composition $BaO.2BaCO_3$.

This may be accomplished, for example, by establishing a bed heated to calcination temperature and containing at least 50 to 75 percent, and preferably in excess of 90 percent, by weight of barium oxide, and adding barium carbonate thereto while withdrawing barium oxide, the rates of addition and withdrawal being such that the BaO content of the bed does not fall below about 50 percent for an appreciable period, and preferably remains above 90 percent by weight during the calcination. Alternatively, barium oxide may be mixed with barium carbonate in amounts equal to 50 percent or more of the barium carbonate-barium oxide content of the mixture, and the mixture introduced into the calcination zone. By recourse to this procedure, the fusion or sintering encountered in prior processes is avoided or minimized to a degree sufficient to permit flow of the material through a calcination zone and, thus, the process may be conducted in a continuous or semi-continuous manner. A typical embodiment of a method of practicing this invention and the apparatus contemplated according to this invention are illustrated diagrammatically in the accompanying drawing.

In order to avoid excessive production of dust and to ensure establishment of a fluidized bed, it is desired to calcine granules of barium carbonate which are of substantial size. Nitrogen or like inert gas is required to promote calcination of barium carbonate and to dilute evolved carbon monoxide, thus to reduce its partial pressure and to increase the rate of reaction. It has been found that the required gas velocity is so high that barium carbonate which has a particle size smaller than about 80 mesh does not readily form a fluidized bed. Consequently, the greater portion of the barium carbonate to be treated should be of a particle size greater than 80 mesh. The maximum particle size depends to some degree upon the gas velocity. In general, it is preferred to make use of a bed having an average particle size ranging from minus 10 to plus 80 mesh.

In general, it is undesirable to calcine raw barium carbonate of the above particle size. Consequently, the barium carbonate itself should be of a relatively fine particle size, usually being well below 100 mesh. This barium carbonate is then made up into pellets or particles by mixing the barium carbonate, carbon black, and a suitable carbonaceous binder. Such binder must be capable of decomposing to evolve carbon or a gas, such as carbon dioxide, at the temperature of operation. Typical binders are starch paste, such as pastes formed from wheat starch and other grain starches, including corn starch, rice starch, and various other gluten-containing materials, glue, sugars, syrups, molasses, tar, high boiling petroleum distillates or pitch and the like, and various other carbonaceous binders of analogous character, particularly those compatible with water. The amount of binder which is used usually is not large and thus does not appreciably affect the required carbon content of the barium carbonate-carbon mixture. Usually, water is used in conjunction with the binder.

In the production of these granules or pellets, carbon, barium carbonate, and the binder are mixed with water in a suitable manner, for example, in a pug mill, to produce a plastic formable mass, and the product is extruded or otherwise formed into rods or like shape, usually having a diameter of ⅛ to ¼ inch. These rods are dried at a low temperature, for example, 100 to 150° C., in order to remove a major portion of the water therefrom. After the drying operation, the extruded rods are found to lose less than 0.1 percent by weight of moisture when heated at 100° C. over a period of 24 hours. This amount is not objectionable. However, larger amounts tend to cause scaling or fusion in the calcination zone.

Thereafter, the granules are lightly crushed and screened in order to obtain particles of the size specified above.

In the practice of the calcination, a tubular reactor adapted to hold a fluidized bed is provided. An upwardly flowing stream of inert gas, such as nitrogen, is introduced into the lower portion of the tube, and a body of previously calcined barium oxide granules is introduced into the reactor to establish a dense fluidized bed thereof. Such a bed has a well defined upper level and is characterized by its high turbulence and its resemblance to boiling liquid.

The fluidized bed having been established, it is heated to calcination temperature and barium carbonate granules introduced. Thereafter, the barium carbonate granules are fed and barium oxide granules withdrawn continuously or intermittently. The composition of the bed remains high in barium oxide, at least 50 percent and usually running over 90 percent by weight of BaO, and thus fusion is minimized by the high BaO content of the bed.

The temperature of operation of the calcination reactor generally is established between 800 and 1100° C. While higher temperatures are operative, the problem of obtaining walls of suitable metal which will stand up during operation and will conduct heat through to the reaction becomes more complex. Furthermore, fusion becomes more serious. Using refractory materials of constructions which are especially adapted to stand the required temperature, temperatures as high as 1200° C., or even higher, can be resorted to. However, the problem of supplying heat to the calcination through a refractory wall is difficult. Heat is supplied by heating the reactor through its walls and/or by pre-heating the fluidizing gas.

Where the barium oxide is used in a cyclic process to produce hydrogen peroxide, it has been found desirable to use a relatively pure grade of carbon in the granules in order to avoid contamination by metals or the like. Otherwise, these impurities build up as the barium compound proceeds through a plurality of cycles. Consequently, relatively pure grades of carbon, such as lampblack and various gas blacks, have been used. Equivalent amounts (as to carbon content) of other carbonaceous reducing agents may be used. Such agents include petroleum pitch, asphalt, tar, petroleum coke, or even coal, provided the amount of impurities is not excessive.

The resulting product produced by the above described fluidizing process is largely in the form of hard granules which are unusually well bonded apparently due to slight local fusion. Where the calcination has been carried out to a relatively high degree of completeness, the granules contain only small amounts of barium carbonate (less than 10 percent and usually 1 to 5 percent by weight of the BaO and $BaCO_3$ in the calcined product), depending upon the degree of calcination, together with some barium peroxide which may form when the barium oxide is allowed to cool in air. The product also may contain some carbon. Usually, where the product is used to produce barium peroxide, the amount of carbon present is held to a minimum, as has been previously explained.

To prevent build-up of scale to an undesirable thickness upon the walls of the calcination reactor, the nitrogen should not contain in excess of ½ percent each of oxygen and carbon dioxide and, preferably, the nitrogen should contain less than 0.1 to 0.2 percent of either of these components. Thus, having permitted a protective coating to form upon the walls, conditions are thereafter adjusted to prevent further growth of this coating.

The apparatus diagrammatically illustrated in Fig. 1 may be used in performance of the fluidized calcination herein contemplated. This apparatus comprises a nitrogen pre-heater 10 which is connected to the fluidizing calciner 20. The nitrogen pre-heater comprises a heater tube 12 which may be of metal or other suitable material, and in which the pre-heating of the nitrogen actually is conducted. Surrounding this heater tube is a heating jacket furnace 14. Suitable sources of heat, such as gas burners and the like, are provided within the furnace 14. The calcination reactor also comprises a metal tube 22 disposed in a furnace shell 24 which provides a chamber surrounding tube 22. Suitable burners (not shown), such as gas, powdered coal, or oil burners are disposed in this chamber to heat the chamber and the interior of tube 22. Since these burners are conventional in structure and operation, they require no discussion here.

The interior of tube 22 is coated with the barium oxide-barium carbonate coating described above. This coating is not shown in the drawing because its thinness is such that to become apparent, its dimension would have to be exaggerated unduly.

In the practice of the process, nitrogen is introduced at a rapid rate into the lower portion of the tube 12 and flows upwardly through line 30 and into the lower portion of tube 12. This nitrogen flows upwardly through a fluidized bed of carbon granules or like relatively coarse inert materials (not shown) which are disposed in tube 12. Additional carbon granules are added as needed from a charging device 32 through line 34. The fluidized bed is heated to an elevated temperature, usually above 500° C. and frequently as high as 1000° C., by powdered coal, oil or gas burners (not shown) disposed in the gas furnace 14, and thereby converts oxygen and carbon dioxide in the nitrogen to carbon monoxide. The heated nitrogen escapes from the top of the pre-heater through line 36 and is discharged into a cyclone separator 38 to separate dust. This dust is collected in the bottom of the separator and may be removed from time to time through the bottom outlet 40.

The nitrogen is removed from the cyclone separator through line 50 and is led to the bottom of tube 22 which tapers to a conical inlet. Barium carbonate granules are fed from a supply bin 52 into a hopper 54 and thence through a rotating star valve 56 into line 58. This line discharges into line 50 and, thus, the hot nitrogen entering the tube 22 picks up the barium carbonate pellets and carries them into the tube 22. A fluidized bed of barium oxide or a mixture of barium carbonate and barium oxide is maintained in tube 22, the upper level of this fluid bed being at the level of the overflow pipe 60. This overflow pipe discharges the calcined product. In order to permit the nitrogen to by-pass the pre-heater and/or the pellet feeding line, by-pass lines 62, 64, and 66 are provided. Effluent gases from the reaction escape above the fluid bed through the top of the tube, as indicated in the drawing.

The practice of this process is especially advantageous since it tends to avoid fusion of the barium carbonate during calcination. Preferably, the fluidized bed is so operated that it is largely barium oxide. It will be understood that inasmuch as the bed itself is turbulent, its composition is substantially uniform, particularly in the upper portions thereof. As a consequence of the calcination, the fluid bed will contain substantial portions of barium oxide and barium carbonate together with some barium peroxide. There is also present a concentration of carbonaceous reducing agent, depending upon the amount of such agent incorporated in the barium carbonate product introduced into the bed.

In calcining barium carbonate according to this method, the fluid bed may be operated in a manner such as to achieve any degree of calcination from 10 to 100 percent. On the other hand, best results are obtained when the barium oxide content of the bed is in excess of 50 percent of the BaO content of the barium carbonate going into the fluidized bed. This method affords a convenient method of avoiding the difficulties encountered in conventional calcining processes which appear to be due to a formation of a barium oxide-barium carbonate eutectic. Thus, there is a definite indication that such eutectic melts at a much lower temperature than do either barium oxide or barium carbonate and consequently the eutectic which may be formed during calcination tends to promote fusion of the product. In contrast, the present process affords a convenient method wherein the barium carbonate is added to a calcining bed which contains a large amount of barium oxide. Thus, the composition of the bed with respect to barium oxide and barium carbonate is above that at which the barium oxide-barium carbonate eutectic has been regarded to exist. Because the overall composition of the bed is such that the barium oxide content thereof is above that at which the low melting barium oxide-barium carbonate eutectic is formed, fusion is minimized. For this reason it is found advantageous to conduct the calcination under conditions such that the bed contains at least 50 to 75 percent, and preferably in excess of 90 percent, of BaO, based upon the total amount of BaO and barium carbonate in the fluidized bed.

It will be understood, of course, that the process may be conducted in a plurality of stages. Thus, two or more fluidized beds of barium oxide and barium carbonate may be provided in order to effect a partial calcination in one bed and a further calcination in another bed. In such a case, the degree of calcination in the first bed may be quite incomplete and the bed may contain as little as 30 percent barium oxide, based upon the total BaO entering the bed. However, even in such cases it is found most advantageous to conduct the operation so that the major portion of the BaO (more than ½) in the fluidized bed is present in the bed as barium oxide. In optimum operation, the beds may contain 90 to 98 percent of barium oxide, base upon the total BaO in the bed. While beds of higher barium oxide content may be operated, this is usually impractical.

The following is an illustrative example of this embodiment of the invention:

*Example I*

The apparatus illustrated in Fig. 1 was used. In this test, the calcination reactor comprised a metal tube 22 having a diameter of 4 inches at the top of the bed level and a diameter of 3 inches at the end of the tube where it was tapered to provide the inlet for the reactants. The distance between the end of the tube and the top of the bed was 56 inches. The nitrogen pre-heater constituted a 4-inch diameter tube 12 which was 36 inches long. The interior of the tube 22 is lined with a thin barium oxide-barium carbonate coating in which the mole ratio of $BaCO_3$ to BaO is 1.9. This may be applied by a previous coating operation or may be developed in the early stage of the process.

In a typical operation, 100 parts by weight of finely divided barium carbonate having a particle size of minus 100 to plus 300 mesh, 7 parts by weight of carbon lampblack, and one part by weight of an aqueous paste of wheat starch, were mixed together using an amount of water sufficient to make a stiff plastic mass. The product was extruded through dies approximately 1/16 inch in diameter. The extruded product was baked for about 12 hours at a temperature of about 140° C. The resulting product comprised a plurality of particles approximately 1/16 inch in diameter and ranging from about 1/16 to 1/4 inch in length.

These products were then cracked or mildly crushed, and the crushed product was screened to obtain a product ranging from minus 14 to plus 30 mesh in size.

In the calcination, nitrogen was introduced into the bottom of the nitrogen pre-heater and passed through a fluidized bed of graphite granules having a particle size of about minus 14 to plus 80 mesh. The temperature of the nitrogen gas escaping from this bed was approximately 540° C. The temperature of the bed was approximately 850 to 900° C. Consequently, the oxygen and carbon dioxide in the nitrogen were almost quantitatively converted to carbon monoxide. (Note that the nitrogen entering the fluid carbon bed contained 0.4 to 0.8 percent by volume of oxygen and only a minute amount of carbon dioxide.)

The resulting heated nitrogen containing less than 0.2 percent oxygen was fed into the calcination reactor at a rate of 200 to 265 cubic feet per hour, computed at 760 millimeters pressure and 70° F. About 20 pounds of previously calcined barium carbonate granules of the type described above and containing in excess of 95 percent BaO were dumped into the reactor and a fluidized bed was established in the reactor. The temperature of this bed was maintained throughout the run at about 945 to 965° C. During the run, the barium carbonate granules were fed into the nitrogen at a rate of 13 to 14 pounds per hour. The operation was continued over a period of 18 hours and the product withdrawn continuously. This product contained 94 to 99 percent by weight of barium oxide. No scale deposit was apparent on the wall. Only a very small amount of solids fed to the reactor were carried off as solids in the gas stream in the form of dust.

In order to develop the desired protective coating on the metal walls, the oxygen content in the nitrogen used in the first run of this character is held at about 0.5 percent by volume for 30 minutes. This may be accomplished by using inert granules rather than graphite granules in the nitrogen pre-heater during such period. Thereafter, the oxygen content of the nitrogen is reduced to below 0.1 to 0.2 percent.

As has been previously explained, it is found preferable to use nitrogen as the fluidizing gas. Air and carbon dioxide are not satisfactory for this purpose since each tends to reverse the reaction and to cause fusion. Carbon monoxide may be used where the temperature of the calcination is above about 1050° C. However, this high temperature sometimes is objectionable because it is difficult to obtain metal which will serve as satisfactory tubes for holding the reaction mixture. Other inert or nonreactive gases may be used, as will be understood by those skilled in the art.

According to a further embodiment of the invention, barium carbonate may be calcined in a stream of a gaseous hydrocarbon. The best hydrocarbon for this purpose is methane. However, other hydrocarbons, such as ethane, propane, butane, propylene, ethylene, butylene, and the like may be used. Such a process may be conducted using methane or like hydrocarbon in lieu of nitrogen or similar nonreactive gas. When such a hydrocarbon is used, it has been found that carbon black commonly incorporated in the particles, may be partially or completely dispensed with. Thus, it has been discovered that during the reaction the methane or like hydrocarbon cracks to deposit carbon on the barium carbonate granules. This is highly surprising since it might well be expected that if the methane cracked during the reaction, the carbon might well deposit upon all portions of the reactor rather than upon the barium carbonate. Actually, the carbon which is formed by cracking of the methane is deposited in the pores of the barium carbonate granules and in such intimate contact that the introduction of methane effectively serves the same purpose as the incorporation of carbon in the granules. A further advantage which arises from the use of methane lies in the fact that if oxygen is present in the fluidizing gas, the methane tends to react with it and thus the objectionable effect or oxygen can be minimized.

Moreover, even partial decomposition or calcination of barium carbonate is permitted when methane is used. As has been shown above, the carbon tends to reduce fusion, and when no carbon is added to the particles, serious fusion results during calcination. While less than the stoichiometric amount (6 percent of the barium carbonate) may be used, the tendency toward fusion gradually increases and becomes quite serious when only 3 or 4 percent by weight of carbon, based upon the barium carbonate, is used. When methane is used, however, this does not appear to be the case.

Quite probably, the fusion is due to the presence of barium oxide which forms a barium oxide eutectic. On the other hand, the barium oxide is not formed at the relatively low calcination temperatures used in the practice of this process, for example, 800 to 1200° C. (usually below 1030° C.) unless carbon is present. When methane or like gaseous hydrocarbon is used as the primary source of carbon, it follows that the calcination can only occur where the carbon has been deposited by virtue of methane cracking.

Hydrocarbons other than methane, including ethane, propane, butane, vapors of petroleum naphtha, petroleum pitch, benzene and like products which, upon heating at the elevated temperatures herein contemplated will crack to form carbon, may be used according to the present invention.

The calcination may be effected using both methane, or like hydrocarbon, and elemental carbon. In such a case, a deficiency of carbon (less than 6 percent, for example, 1 to 4 percent by weight) may be incorporated in the granules prior to calcination, and the hydrocarbon used to supply the balance of the carbon.

The following examples are illustrative of the process involving use of methane:

Example II

The apparatus used was that described in Example I except that methane was fed, without pre-heating, into the reactor in lieu of nitrogen. Granules were prepared from a mixture of 1 part by weight of wheat paste and 100 parts by weight of barium carbonate, no carbon being used. These granules were produced by extrusion, drying, crushing, and sizing, as described in Example I. The barium carbonate granules thus obtained were fed to the reactor at a rate of 6.2 pounds per hour. Methane was fed into the reactor in lieu of nitrogen at a rate of 285 cubic feet per hour, measured at a pressure of 760 millimeters and a temperature of 70° F. The temperature of the reaction bed was maintained at approximately 975° C. during the run, and the barium oxide content of the bed remained at 90 to 92 percent by weight of the bed. The calcination was carried out for a period of 5 hours, and the product withdrawn contained 90 to 92 percent of barium oxide. The bed did not fuse or stick during the run.

Example III

Using the apparatus described in Example I, a fluidized bed of baked barium carbonate granules having a particle size such that 100 percent passed through 14 mesh and remained on 30 mesh was established. These granules were prepared as described in Example I except that 4 parts by weight of carbon and 1 part by weight of wheat starch were used per 100 parts by weight of barium carbonate. These granules were fed to the reactor at a rate of 14.4 pounds per hour, according to the process of Example I. Nitrogen pre-heated to a temperature of approximately 550° C. flowing at a rate of 200 to 285 cubic feet per hour and measured at 760, was mixed with a stream of cold methane flowing at a rate of 56 cubic feet per hour. These gas flows were measured in terms of the flow at 70° F. and 760 millimeters pressure. The resulting gas mixture was fed into the bottom of the reactor as in Example I, and was used to maintain the fluidized bed. The operation was continued over a period of 7 hours and the resulting product was continually withdrawn during the run. This product contained 92 to 97 percent BaO.

Example IV

The procedure in this experiment was substantially that described in Example I, and the equipment was the same. The feed was a mixture of 7 parts by weight of carbon, one part by weight of wheat paste, and 100 parts by weight of barium carbonate, the particles which were greater in size than 14 mesh or less than 30 mesh being screened out. The feed of these granules was 10.4 pounds per hour. The nitrogen was heated in the pre-heater at a temperature of about 500° C. and fed into the reactor at a rate of 225 cubic feet per hour. Prior to introducing the nitrogen into the reactor, it was mixed with cold methane introduced at a rate of 50 cubic feet per hour. These gas flows are expressed in terms of their volume at 760 millimeters pressure at 70° F. This mixture was fed into the bottom of the reactor and used to establish the fluidized bed. The temperature of the reaction bed was maintained at 950° C. throughout the run. The run was continued for a period of 3¾ hours at these conditions, and the product which was withdrawn continually during the run contained 93 to 95 percent BaO.

The barium carbonate used in the runs was substantially all barium carbonate containing small amounts, usually not in excess of about 1 or 2 percent of barium hydroxide and, in some cases, a small amount of sulfur, usually not in excess of about ½ to 1 percent.

While calcination in a fluidized bed is found to be especially effective, other methods of calcination may be resorted to. For example, the granules prepared as described above or even a finely divided mixture of barium oxide, barium carbonate, and carbon may be placed on a rotary hearth or like heating apparatus, the exposed surfaces of which may be coated with barium oxide or barium oxide-barium carbonate as herein contemplated, and calcined in a stream of inert gas. To avoid or minimize fusion, it is usually desirable to mix the barium carbonate with previously calcined granules. Thus, a portion of the calcined product may be recycled and mixed with barium carbonate entering the furnace, as has been explained above. In such a case, the barium oxide content of the mixture normally will exceed 50 percent of the BaO content of the mixture undergoing calcination. By such means, fusion due to the production of a low melting barium oxide eutectic may be minimized. Radiant heat may be used to heat the hearth in such a process.

Moreover, the barium carbonate-carbon mixture may be prepared in other ways. For example, barium carbonate granules such as prepared according to Examples II or III, or other barium carbonate compositions which contain little or no carbon or like hydrocarbon, may be subjected to a pre-treatment with methane at cracking temperatures, for example, 400 to 800° C., in order to deposit carbon upon the barium carbonate. Such granules may be calcined in the usual manner, for example, according to the method shown in Example I.

Barium oxide which is produced by this process may be used for many purposes. It may be reacted with air to produce various barium salts. It also may be hydrated to produce barium hydroxide.

According to a further embodiment, barium oxide granules pre-heated to a temperature above calcination but below fusion temperatures may be introduced into a fluidized bed such as that described in Examples I to IV. By this means, additional heat may be introduced into the calcining chamber, thus reducing the amount of heat which must pass through the walls of the chamber and permitting use of more refractory and less heat conductive materials of construction. The barium carbonate granules also may be pre-heated to reaction temperature, or somewhat below, for the same purpose.

The above described reactor is especially useful for calcination of barium carbonate. However, it may be used to react barium oxide with oxygen to produce barium peroxide according to methods described in application for United States Letters Patent Serial No. 279,787, filed April 1, 1952, of Henry W. Rahn, John W. Moore, and Charles J. Sindlinger.

Although the present invention has been described with reference to the specific details of certain embodiments thereof, it is not intended that such details shall be regarded as limitations upon the scope of the invention except insofar as included in the accompanying claims.

This application is a continuation-in-part of our copending application Serial No. 279,786, filed April 1, 1952.

What is claimed:

1. In the calcination of barium carbonate by establishing a fluidized bed comprising barium carbonate and carbon in an upwardly rising stream of inert gas, said bed being disposed in a reactor having a metal wall, while heating the bed by transfer of heat into the reactor from a point exteriorly thereof through said metal wall, the improvement which comprises heating said bed through a metal wall which is coated on the side in contact with the fluidized bed with an adherent coating of a member of the group consisting of barium oxide and mixtures of barium oxide and barium carbonate, said coating being less than ⅛ inch in thickness.

2. In the calcination of barium carbonate by establishing a fluidized bed comprising barium carbonate and carbon in an upwardly rising stream of inert gas, said bed being disposed in a reactor having a metal wall, while heating the bed by transfer of heat into the reactor from a point exteriorly thereof through said metal wall, the improvement which comprises heating said bed through a metal wall which is coated on the side in contact with the fluidized bed with an adherent of a mixture comprising barium oxide and barium carbonate, said coating being less than ⅛ inch in thickness.

References Cited in the file of this patent

UNITED STATES PATENTS

| | | |
|---|---|---|
| 339,360 | Batho | Apr. 6, 1886 |
| 974,921 | Rollin | Nov. 8, 1910 |
| 1,047,077 | Kirchner | Dec. 10, 1912 |
| 1,243,190 | Kremers | Oct. 16, 1917 |
| 1,852,162 | Harris et al. | Apr. 5, 1932 |
| 1,870,034 | Brophy et al. | Aug. 2, 1932 |

FOREIGN PATENTS

| | | |
|---|---|---|
| 908 | Great Britain | 1878 |

OTHER REFERENCES

"Rules of Practice of U. S. Patent Office," Jan. 1, 1953, p. 122.

McPherson and Henderson book "General Chemistry," 3rd ed., page 596. Ginn and Co., New York.